United States Patent Office 3,486,389
Patented Dec. 30, 1969

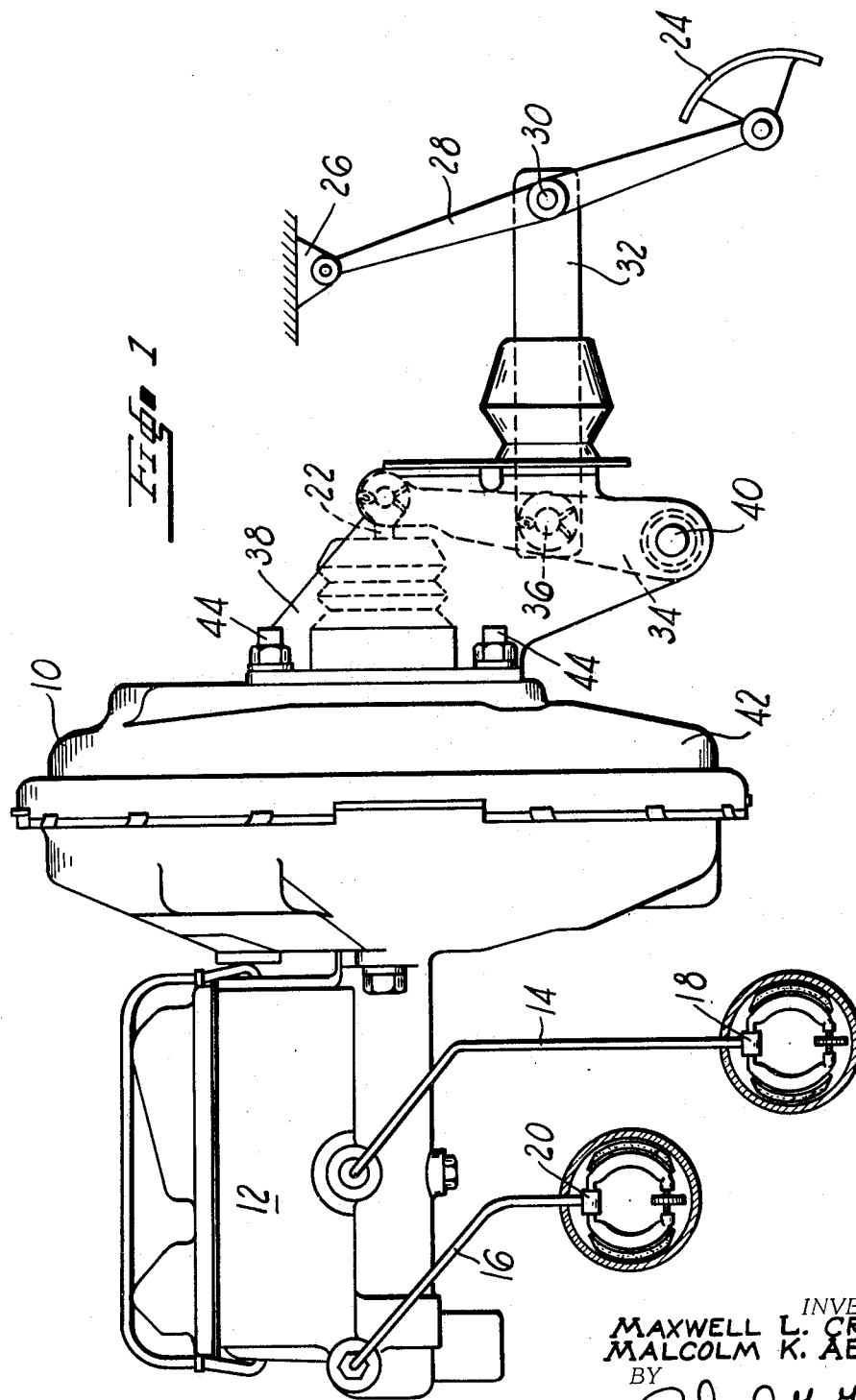

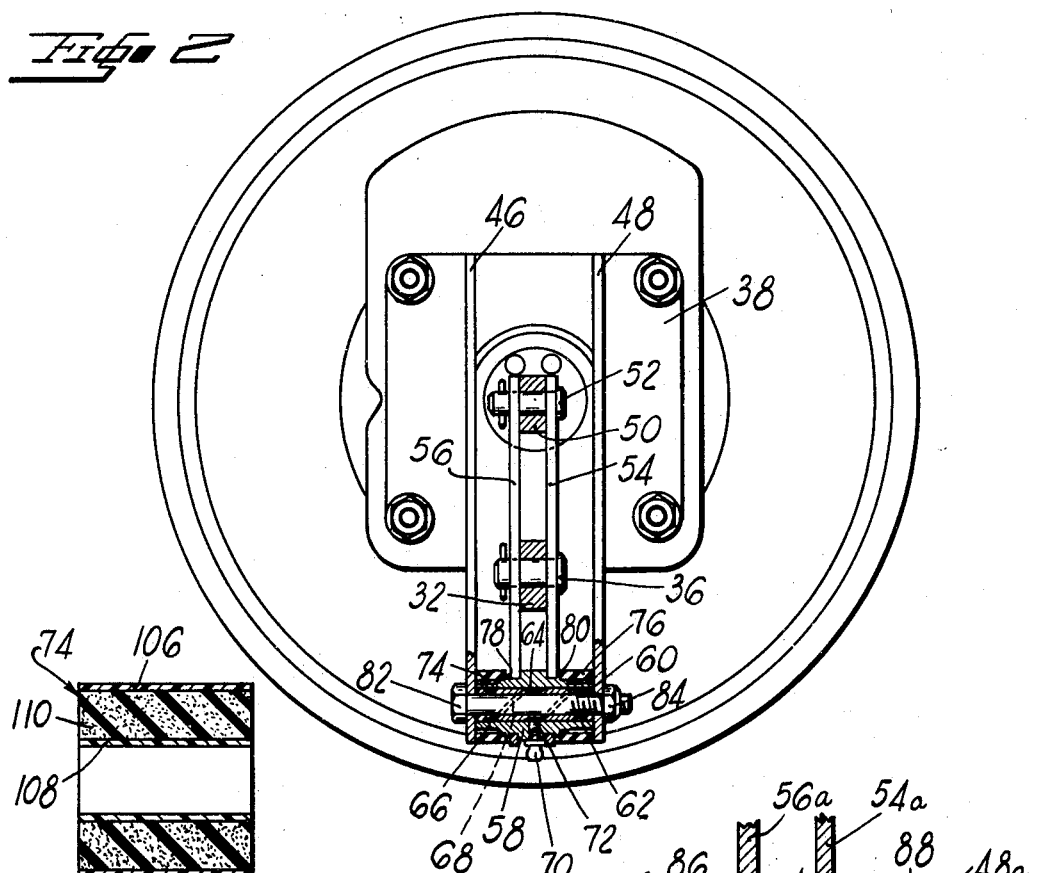

3,486,389
LUBRICATED PIVOT FOR SERVOMOTOR
Maxwell L. Cripe and Malcolm K. Abbott, South Bend, Ind., assignors to The Bendix Corporation, a corporation of Delaware
Filed Jan. 26, 1968, Ser. No. 700,843
Int. Cl. F16h 21/44
U.S. Cl. 74—102          1 Claim

ABSTRACT OF THE DISCLOSURE

A lubricable pivot for a lever means supported by a servomotor housing, which lever means is connected to operator-operated means of the servomotor.

SUMMARY

Due to certain constructional features of vehicle firewalls and the sizing of power brake servomotors it has become necessary to incorporate lever mechanisms between the brake pedal and the push rod controlling the valve mechanism within the servomotor. It has been observed that corrosion develops about the pivot member of this lever mechanism binding up the lever movement after a period of time.

It is therefore a principal object of this invention to provide a lever mechanism whereby the pivoting parts are sealed to eliminate corrosive binding of the elements.

It is a further object of this invention to provide such a pivot assembly for a lever mechanism with means to incorporate a lubricant.

DESCRIPTION

Other objects and advantages of this invention will appear from the following description of the drawings in which:

FIGURE 1 is a side view of a power brake servomotor having a lever mechanism in accordance with this invention which, servomotor also is shown to be schematically attached to braking elements of a vehicle;

FIG. 2 is an end view of the servomotor of FIGURE 1 showing a cross sectional view of a lever mechanism in accordance with the principles of this invention;

FIGURE 3 is an enlarged cross sectional view of the pivot assembly for the lever mechanism in accordance with the principles of this invention;

FIGURE 4 is an enlarged cross-sectional view of still another embodiment for the pivot assembly of the lever mechanism in accordance with this invention; and FIGURE 5 is an enlarged view of the seal means employed with the pivot assembly for the lever mechanism of FIGURE 2.

With specific regard now to FIGURE 1 there is shown a vacuum type servomotor employing a vacuum booster 10 with a hydraulic master cylinder 12 for providing separate pressures in conduits 14 and 16 for respective wheel cylinders 18 and 20 for vehicle brakes on separate axles of the vehicles.

The vacuum booster 10 as well as the master cylinder 12 have internal construction which is quite familiar to the art. Essentially the vacuum booster 10 employs an internal valving arrangement actuatable by a push rod 22 shown in dash lines by FIGURE 1. A brake pedal 24 is pivoted at its upper end to a bracket 26 affixed to the firewall of the vehicle. Also the lever 28 of the brake pedal 24 is connected, as at 30 to a link 32 joining the lever 28 to a lever 34 shown in dashed lines, as by a pin 36 shown in dashed lines in FIGURE 1. The lever 34 is pivoted to a bracket 38 by means of a pin or bolt, as the case may be, 40. The bracket 38 is affixed to the rear shell 42 of the servomotor 10, as by the mounting lugs 44, which are utilized to join the servomotor 10 to the vehicle's firewall. With regard now to FIGURE 2 it will be readily observed that the bracket 38 comprises two vertically extending plates 46 and 48 to either side of the eyelet 50 of the push rod 22. The eyelet 50 is connected by pin 52 to two spaced lever arms 54 and 56 internally of the plate 46 and 48 of the bracket 38, as at the upper end of the lever arms 56 and 54. Intermediate of the ends of the lever arms 54 and 56 the pin 36 joins the link 32 thereto, as aforementioned. The pins 52 and 36 are held in position by cotter pins. The lower ends of the lever arms 54 and 56 are press fitted onto a sleeve 58 within which a bearing member 60 is inserted having a plurality of lands forming annular grooves 62, 64 and 66 which, as shown, are connected by spiral grooves 68 shown in dashed lines in FIGURE 2. A grease fitting 70 is then threaded to an inlet port 72 of the sleeve 58 between the lever arms 54 and 56. Upon assembly within the plates 46 and 48 annular seals 74 and 76 are placed against shoulders 78 and 80 of the sleeve 58. Thereafter the pivot assembly comprised of the sleeve 58 and the bearing 60 is inserted between the plates 46 and 48 and a bolt 82 is projected through the bearing 60 and a self-locking nut 84 is threaded onto the bolt to slightly compress the annular seal 74 and 76 between the plates 46 and 48 and the lever arms 56 and 54, respectively.

The modification in FIGURE 3 includes similar elements as in FIGURE 2 which are identified by the same number with a suffix "a" applied thereto. More particularly, the only differences between the structure of FIGURE 3 than that of FIGURE 2 is in the seal and bearing members. Specifically, the annular seals are formed to have annular lips 86 and 88 contacting plates 56a and 54a. The bearing member 60a is provided with an axial or longitudinal passage 90 rather than the spiral passages 68 of the bearing 60 of FIGURE 2. Thus, the grease which is introduced by a fitting (not shown) to inlet chamber 64a is directed via passage 90 to the annular grooves 62a and 66a adjacent the ends of the bearing 60a.

As for the modification shown in FIGURE 4, the only difference in this and the previous structures is the change in the bearing and seal members which employs two end bearings 92 and 94 whereby a large space 96 between each of the end bearings 92 and 94 is provided between the bolt 82b and the sleeve 58b. In this embodiment seals in the form of hard rubber dished washers 98 and 100 are placed over the end flanges 102 and 104 and slightly compressed upon assembly of the bolt 82b by the nut 84b to prevent moisture and other contaminants from being destructive to the bearing support for the lever arms 56b and 54b.

With reference now to FIGURE 5 the seal 74 which is exactly like the seal 76 is shown in enlarged cross-section to comprise an imperforate inner and outer surface 106 and 108, respectively, which are joined by an annular, porous, foam rubber core 110. The smooth inner and outer surfaces 106 and 108 protect the core 110 from moisture and/or contaminants as well as from the lubricant within the pivot assembly between bearing 60 and sleeve 58. In addition the large face area of the core 110 on the plates 46 and 48 provide a labyrinth type seal effect with respect to the plates 46 and 48 as well as providing a large seal area with respect to these plates with a minimum of frictional resistance because of the large porous area.

Having fully described a construction with several embodiments of my invention from which the operation is

I claim:
1. A fluid pressure servomotor operating means having a pivot for a lever mechanism within a bracket, said pivot comprising:
- a pin non-rotatively affixed to the bracket;
- bearing means carried on said pin;
- sleeve means affixed to the lever mechanism and revolvably supported by the bearing means on said pin;
- said bearing means having annular grooves adjacent each end and an annular space intermediate said annular grooves;
- said sleeve having spiral passages and a port communicating with said annular space, said spiral passages also communicating with said annular grooves;
- annular seal means compressed between said sleeve means and said bracket; and
- a one-way fitting installed in said port to provide a lubricant via the port to said annular space, said spiral passages and said annular grooves.

References Cited

UNITED STATES PATENTS

| | | | |
|---|---|---|---|
| 1,382,355 | 6/1921 | Greiner | 308—240 X |
| 1,485,984 | 3/1924 | Jones | 308—240 X |
| 1,674,453 | 6/1928 | Sloper | 308—240 |
| 1,991,491 | 2/1935 | Calkins | 277—95 X |
| 2,190,443 | 2/1940 | Dalzell | 308—36.1 X |
| 2,912,264 | 11/1959 | Peck | 308—187.1 |
| 2,951,721 | 9/1960 | Asp | 277—233 |
| 3,035,809 | 5/1962 | Dickinson. | |
| 3,250,183 | 5/1966 | Gephart. | |

FOREIGN PATENTS

| | | |
|---|---|---|
| 502,068 | 5/1954 | Canada. |
| 546,936 | 11/1922 | France. |
| 668,228 | 3/1952 | Great Britain. |

MARTIN P. SCHWADRON, Primary Examiner

L. L. JOHNSON, Assistant Examiner

U.S. Cl. X.R.

287—100; 308—36.1, 240